United States Patent [19]
Martin et al.

[11] Patent Number: 5,230,871
[45] Date of Patent: Jul. 27, 1993

[54] METHOD FOR GENERATING HEAT, COMPRISING DESULPHURIZATION OF EFFLUENT WITH FINE PARTICLES OF ABSORBENT IN A ENTRAINED BED

[75] Inventors: Gérard Martin, Rueil Malmaison; Jean-Louis Bouju, Luzarches, both of France

[73] Assignees: Institut Francais du Petrole, Rueil Malmaison; Babcock Enterprise, La Courneuve, both of France

[21] Appl. No.: 723,124

[22] Filed: Jun. 28, 1991

[30] Foreign Application Priority Data

Jun. 28, 1990 [FR] France ................... 90 08311

[51] Int. Cl.⁵ .................... B01J 8/00; C01B 17/00
[52] U.S. Cl. .................... 423/244.07; 423/244.01
[58] Field of Search ............ 423/239, 242 A, 242 R, 423/239, 239 A, 244 A, 244 R, 244.01, 244.07

[56] References Cited

U.S. PATENT DOCUMENTS 4,277,450 7/1981 Dilworth .
4,670,237 6/1987 Graf et al. .................... 423/244

FOREIGN PATENT DOCUMENTS 0362015 4/1990 European Pat. Off. .
2575272 6/1986 France .

*Primary Examiner*—Gregory A. Heller
*Attorney, Agent, or Firm*—Millen, White, Zelano & Branigan

[57] ABSTRACT

For generating heat, with reduced emission of sulphur and nitrogen oxides, a fuel containing sulphur oxides and nitrogen is effected, the combustion burned and particles of a fresh absorbent are fed into a turbulent zone (9) upstream of an adiabatic desulphurisation zone (8); and the mixture produced is passed into a heat recovery zone (16). Part of the absorbent is recycled to the desulphurisation zone, and the flow rate of fresh absorbent and recycled absorbent is adjusted so that the temperature of that zone is from 750° to 1000° C.

17 Claims, 1 Drawing Sheet

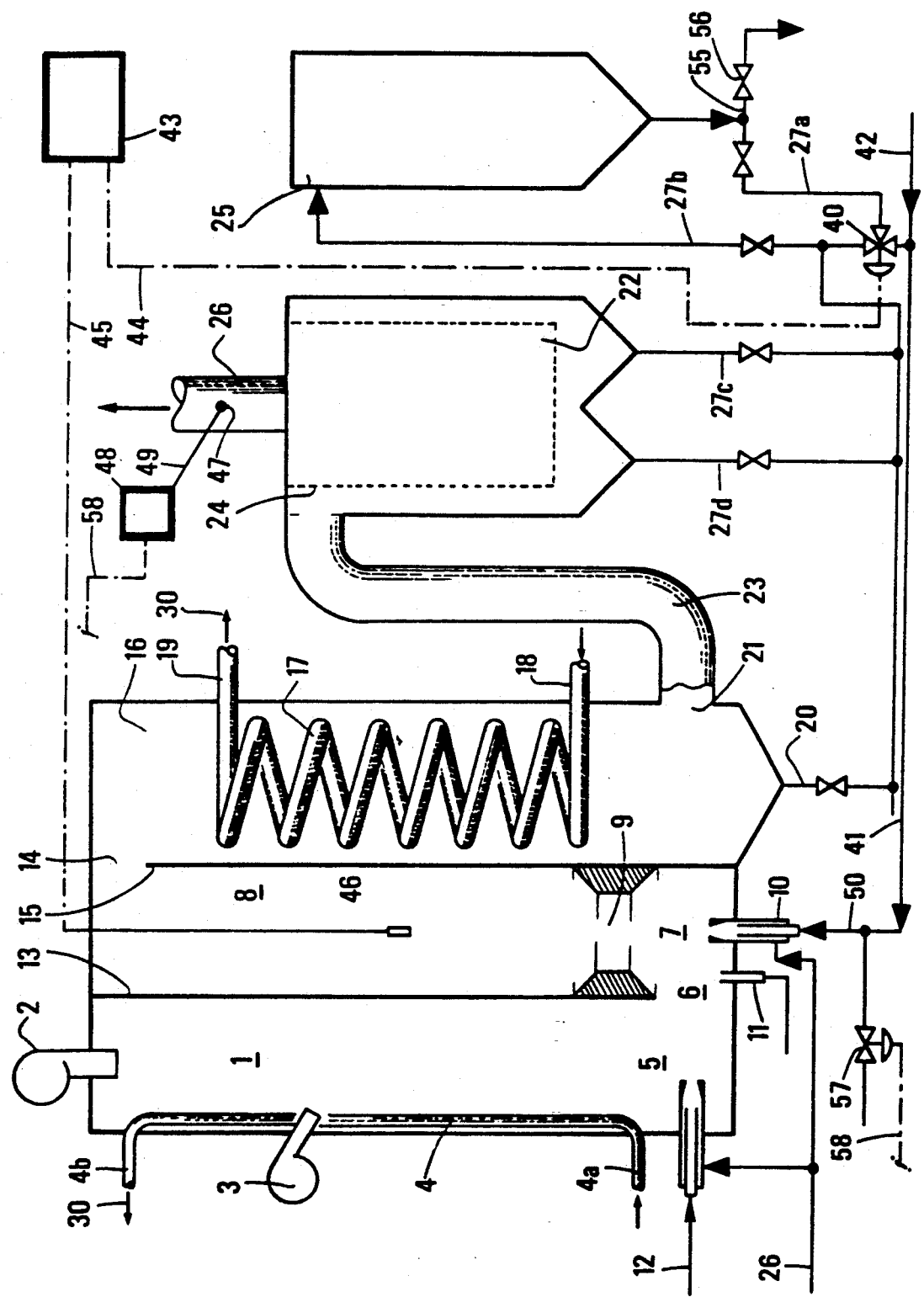

METHOD FOR GENERATING HEAT, COMPRISING DESULPHURIZATION OF EFFLUENT WITH FINE PARTICLES OF ABSORBENT IN A ENTRAINED BED

BACKGROUND OF THE INVENTION

This invention relates to a method and apparatus for generating heat from combustion of a fuel with a high sulphur and nitrogen content, having reduced emission of sulphur oxides, nitrogen oxides and unburnt combustible compounds. More particularly, it relates to the control and optimisation of desulphurisation in a entrained bed in a heat generator.

In protected zones strict regulations limit sulphur oxide emissions in gaseous effluent from heat generators and prohibit the use of fuels with a high sulphur content, which may moreover have definite economic advantages: this is the case with some coals of the lignite family and petroleum residues from refinery processes.

The technological background is illustrated by Patents U.S. Pat. Nos. 4,277,450, EP-A-0093063, EP-A-0211458 and DE-A-3235558. Patent EP-A-0362015 is also known, describing an apparatus for generating heat in a fluidised bed without any recycling of absorbent particles. Patent FR 2575272 on the other hand describes a method which includes recycling the particles the combusion chamber, where both combustion and desulphurisation of the fuel are carried out. None of these patents suggests the technical problem mentioned below.

It is known from French Patent 2636720 to reduce emissions of sulphur oxides and particularly sulphur dioxide from a heat generator which accepts fuels with a high sulphur content. A combination of three main elements is in fact used, forming a compact unit: a combustion chamber with cold walls, a heat recovery unit which absorbs the heat from the combustion gases and circulating particles, and an intermediate entrained bed having no appreciable internal heat exchange area, its function being to desulphurise the gases in transit between the upstream combustion chamber and the downstream heat exchanger. The technical problem generally encountered in this type of steam generator is the fact that the great majority of heaters are required to function at variable loads, so that steam production can be adapted to demand. Any change in the throughput of the heater, that is to say, any change in the flow rate of air and fuel, is inevitably accompanied by variation of the thermal profiles inside the actual heater, for the coefficients of heat exchange, by convection and a fortiori by radiation, are not directly proportional to the flow rate of fumes travelling through the heat exchange areas.

In the case of the heat generator described in Patent FR 2636720, a reduction in loads leads to a drop in the mean temperature of the desulphurisation chamber. The drop may be of 200 or even 300° C., when the heat production of the generator is less than 30% of that under nominal operating conditions. The desulphurisation chamber has to operate within a temperature range which may be fairly narrow with some types of absorbent (e.g. 850° to 950° C. for some limestones), however, and hence desulphurisation performance may suffer greatly if the load is reduced. It is known that temperature variations may be considerably reduced if fumes collected after the last heat exchange zone are recycled to the combustion chamber. This solution could be envisaged to solve the problem of temperature maintainence in the desulphurisation chamber, but it involves a relatively high capital outlay which would be difficult to justify for an industrial scale heater with an output of only a few magawatt to some tens of megawatts.

To maintain the temperature of the desulphurisation chamber or to avoid too great a drop when the load is reduced, the proposed solution comprises recycling not the gases but at least part of the used absorbent which is recovered downstream of the final heat exchanger. A method has been discovered which solves the above problem and in particular enables high desulphurisation speeds to be obtained and the absorbent utilisation rate to be increased at a lower cost, whatever the operating speed of the heat generator.

Another object of the invention is to keep the temperature of the chamber for desulphurising the fumes resulting from combustion of the fuel at a level compatible with optimum operation of the generator, whatever its load.

SUMMARY OF THE INVENTION

More specifically, a method of generating heat with reduced emissions of sulphur oxides, nitrogen oxides and unburnt combustible compounds has been discovered, wherein:

a) combustion of a fuel containing sulphur and nitrogen is effected in a combustion zone comprising a heat exchange zone, (heater) in which heat is at least partly extracted, said combustion being effected in the presence of a gas containing oxygen, under conditions substantially close to the combustion stoichiometry, and the combustion effluent is recovered at a temperature from 800° to 1200° C., b) the combustion effluent and particles of a fresh absorbent, containing at least one basic compound of an alkaline earth metal, are fed into at least one turbulent zone upstream of a desulphurisation zone, said particles being from 1 to 100 microns in size and having a density of 500 to 4000 kg/m$^3$, c) said effluent is desulphurised in a desulphurisation zone, in the presence of said particles, in an entrained bed, and in an oxidising atmosphere, under conditions such that the oxygen content at the outlet from the desulphurisation zone is from 0.1 to 5% by volume, said effluent having a surface velocity preferably from 2 to 20 m/s at the outlet of the desulphurisation zone, and a mixture is produced, containing said particles comprising sulphur compounds from desulphurisation and a desulphurised gaseous effluent.

d) said mixture is passed into a heat recovery zone, heat is at least partly extracted from said mixture, and at least part of the absorbent particles is possibly recovered, e) the mixture resulting from stage d) is separated in a separation zone, the at least partly cooled gaseous effluent, freed from most of the sulphur oxides, nitrogen oxides and unburnt fuel, is discharged, and said particles of absorbent comprising at least part of said sulphur compounds (described as used particles) are also discharged, The method is characterised in that at least part of the particles emanating from stage e) and possibly from stage d) is recycled to stage b), upstream of the turbulent zone, under conditions such that the temperature of the desulphurisation chamber is from 750° to 1000° C. (range for optimum operation).

The complete separation of combustion and desulphurisation, which take place in two different chambers, enables each of the two functions to be optimised separately. In fact combustion takes place with a very small excess of air or even a lack of air, generally at from 90 to 110% of the combustion stoichiometry and advantageously from 96 to 104% thereof. Thus the production of nitrogen oxides is reduced in exchange for having a larger quantity of unburnt combustible products which will be burnt in the desulphurisation zone.

The particles of absorbent which are finally introduced at stage b) contain a portion of fresh particles (unused and at a temperature close to ambient) and a portion of used particles, which have been recycled whatever the throughput of the generator and which are adapted to cool the combustion effluent.

The use of absorbent, in the form of fine particles advantageously from 5 to 25 microns, enables high desulphurising rates to be obtained and increases the utilisation rate of the calcium or magnesium contained in the absorbent.

One feature of the invention is that the so-called fresh particles are normally at a temperature substantially close to ambient temperature.

Another feature of the invention is that the temperature of the recycled particles is generally from ambient temperature to 400° C. and preferably from 50° to 150° C.

Another feature of the invention is that the flow rate of recycled absorbent, both at the nominal load on the heater and at a reduced load, is generally from 0.01 to 15 times, and preferably from 2 to 8 times the flow rate of fresh absorbent injected into the desulphurisation chamber.

As the load on the heater is reduced, the flow rate of recycled absorbent is lowered accordingly. The principle on which it is lowered is decided by the user.

It may be linear or of the polynomial type. It will depend chiefly on the optimum operating range of the absorbent used and the maximum flexibility required of the steam generator. This flexibility is characterised by the ratio of output in nominal operation to output in minimal operation (for example, flexibility of 4/1 signifies that the heater can be operated at 25% of the output in nominal operation).

The heat exchange areas of the steam generator located in the combustion chamber upstream of the desulphurisation chamber are calculated, so that the working temperature of the desulphurisation chamber in nominal operation corresponds substantially to the upper limit of the optimum temperature range for desulphurisation. The working temperature of the desulphurisation chamber refers to the mean of the temperature at the inlet of the desulphurisation chamber, after the absorbent has been mixed in, and the outlet temperature of the desulphurisation chamber.

The lowering of the load of the heater will generally result in a lowering of temperature, but as a result of the method envisaged the temperature will generally be kept within the optimum temperature range, that is to say, it will not exceed e.g. 200° C. in the worst case.

Another advantage of the method is that it enables better absorbent utilisation to be obtained that does the option without recycling. Recycling in fact gives the absorbent a longer total dwell time in the desulphurisation chamber. Moreover it has been observed that the absorbent could absorb a certain amount of humidity at the final dust-removing stage, and that this humidity encouraged the development of an additional reaction surface when the absorbent was reinjected into the desulphurisation chamber. In short, it is preferable e.g. for the absorbent to have five successive stays of 1 second in the desulphurisation chamber, interspersed with partial absorption of humidity, rather than a single stay of 5 seconds without any intermediate absorption of humidity.

Recycling also has a beneficial effect on the desulphurisation yield with a constant molar ratio of Ca/S, since it enables the quantity of active material present in the desulphurisation chamber to be increased.

In reduced operation the recycling flow rate is lowered, but the total mean dwell time of the absorbent in the unit remains substantially the same, because the velocity of the gases in the desulphurisation chamber is reduced. In some cases it may even be longer than in nominal operation, if the flow rate of fumes decreases in higher proportions than the recycling rate. In this way the desulphurisation performance may be kept constant for any load of the heater, without the Ca/S ratio being increased as is generally the case in the option without recycling.

Another advantage of the method results from the fact that, when the particles are recycled according to the invention the mean concentration of particles is higher, although some of them are used ones, i.e. although the calcium availability in some of them is lower than in the fresh particles. The same results can consequently be obtained in a shorter time. In other words, a desulphurisation reactor of decreased volume may be used and the investment therefore reduced.

Another feature of the invention is that the used absorbent may be treated with steam or water under appropriate conditions in order to increase humidity absorption, before the stage when the recycled particles are reinjected into the desulphurisation chamber. The operation may be carried out with any apparatus known in the art, particularly a stepped blender.

Another feature of the method of the invention is that the desulphurisation stage is generally carried out with a concentration of fresh and recycled particles in the gaseous combustion effluent and in the oxidant gas from 0.02 to 1 kg/Nm$^3$ and preferably from 0.05 to 0.2 kg/Nm$^3$ of fumes and gas (N=normal, that is to say at 0° C. and 1 atmosphere).

As a general rule the dwell time of the particles in the desulphurisation zone is from 0.5 to 10 seconds and preferably from 1 to 2 seconds.

Amonia or urea may be fed into the desulphurisation chamber, preferably upstream, to increase the denitrification of the combustion effluent if necessary. Air may similarly be added so that desulphurisation can be effected in an oxygen atmosphere, if the combustion stage is not carried out in an excess of air.

The turbulent zone, preferably upstream of the desulphurisation chamber, induces turbulence, encouraging intimate mixing of the fresh and recycled particles and gases in the entrained bed.

The turbulent zone may be created by any means known in the art; for example ports, venturis, diaphragms or a porous medium may be used.

The most frequently used absorbents are dead lime, limestones ($CaCO_3$) or dolomites ($CaMg (CO_3)_2$), used alone or in mixtures. The products of cement works may equally be used, the products having fine particles and being taken before the burning stage.

BRIEF DESCRIPTION OF THE DRAWINGS

The FIGURE is a schematic illustration of apparatus useful to accomplish the method of the invention.

DETAILED DESCRIPTION

The apparatus (see the figure) more specifically comprises a chamber (1) with an outlet (5), means (2) for burning a fuel in said combustion chamber, first means (4) for recovering heat in said combustion chamber, a substantially adiabatic desulphurisation chamber (8) with an inlet (7) connected to the outlet (5) of the combusion chamber and an outlet (14), a heat recovery chamber (16) connected to the outlet of the desulphurisation chamber with an outlet (21) and a chamber (22) for separating a desulphurised gaseous effluent from the at least partly used particles of absorbent, connected to the outlet (21) of the heat recovery chamber; the desulphurisation chamber having at least one wall (13) in common with the combustion chamber and at least one wall (15) in common with the heat recovery chamber (16), said inlet (7) of the desulphurisation chamber having means (10) for supplying with particles of fresh absorbent and means (9) for inducing turbulence in the circulating particles.

The apparatus is characterised in that it comprises means (50, 41, 10) for recycling at least partly used particles of absorbent to the inlet (7) of the desulphurisation chamber, and means (43, 46) for adjusting and controlling the flow rate of recycled particles of absorbent, all these means being adapted to cooperate to keep the desulphurisation chamber in substantially optimal operation.

A substantially adiabatic desulphurisation chamber is understood as being a chamber which virtually does not exchange any heat with the external surroundings or the adjacent chambers either through its walls or through heat exchangers in the actual entrained bed. The drop in temperature between the inlet and the outlet of said chamber will generally be small, so that the desulphurising reaction will still be sufficiently effective at the outlet temperature of the chamber (for example at an outlet temperature of 750° C.).

One feature of the invention is that the recycling means comprise at least one flow rate regulating valve (40), connected to the outlet of the separating chamber (22) and/or to an outlet of a storage chamber (25) and/or to an outlet in the lower part of the heat recovery chamber, said valve being connected to at least one particle injector (10) by a pipe (41).

Another feature of the invention is that the means for adjusting and controlling the flow rate of used particles comprise control means (43) connected to a temperature probe (46) in the desulphurisation chamber and to the valve (40) for regulating the flow rate of particles.

In a special embodiment the outlet of the combustion chamber may include a continuous passage connected to the inlet of the desulphurisation chamber, the passage containing feed means, particularly for feeding particles of fresh and recycled absorbent. All these means are adapted for co-current circulation of the effluent combustion gases and absorbent in the desulphurisation chamber.

Another feature of the apparatus is that the desulphurisation chamber and the heat recovery chamber have a common wall, which may contain at least one port adapted to the passage of the desulphurised gaseous effluent and particles of absorbent into the inlet of the heat recovery chamber.

The invention can be understood better and its advantages clarified by reading the following description of a special, non-restrictive example which is illustrated by one accompanying drawing.

The drawing shows an apparatus according to the invention, comprising an elongated combustion chamber 1 of square or rectangular section, which is preferably vertical and which can burn any type of solid or liquid fuel containing sulphur and nitrogen, the fuel being injected into the chamber 1 in atomised form by a burner 2 supplied with oxidant gas. The burner is advantageously arranged along the axis of the chamber and in the upper portion thereof.

The fuel may be a vacuum residue, a fluxed asphalt, solid fuels, fuel/coal composite fuels, coal/water suspensions or the like.

The fuel is burnt without excess air, in order to reduce the formation of nitrogen oxides to the maximum. In the course of combustion part of the energy liberated is drawn off through the heat exchange tubes 4, to bring the temperature of the gaseous combustion effluent to from 800° to 1200° C. The effluent leaves the outlet 5 at the lower end of the chamber and circulates through a passage 6, before reaching the inlet 7 of a chamber for substantially adiabatic desulphurisation, the walls of which may comprise membrane tubes which may be partially or fully covered with insulating materials.

An injector 10 is arranged in the passage. It feeds particles of fresh absorbent, or droplets e.g. in teh case of a limestone suspension, through a supply line 50 into the desulphurisation chamber.

The same injector also feeds in used absorbent recycled through a line 41 connected to the line 50. The recycling line 41 is connected to a rotary valve 40 (or any other means known in the art which will fulfill the same function). The valve or other means is itself connected to a discharge line 27a of a storage chamber 25 and/or to a discharge line 27c of the separating chamber and/or possibly to a discharge line 20 connected to the lower end of the heat recovery chamber.

The flow of recycled particles is delivered by the valve 40 which is controlled by a temperature reading given by a probe 46, through control means 43 via a line 44. The probe 46 is located in the desulphurisation chamber and connected to the adjusting and control means 43 by a line 45.

The recycled absorbent is passed pneumatically to the desulphurisation chamber through the line 41, which is supplied with carrier gas (air or steam) through the line 42. Thus the total cooling in the combustion chamber and at the inlet of the desulphurisation chamber, resulting from the introduction of fresh particles at about 20° C. and used recycled particles e.g. at a temperature of 100° C., is substantially proportional to the power liberated by the burner as a general rule.

Particles of a size centered around 15 microns circulate co-currently with the combustion effluent. When the desulphurised effluent leaves the chamber, a velocity of 2 to 20 m/s is imparted to it. The flow rate of particles is such that it leads to concentrations ranging from 0.05 to 0.2 kg per normal m$^3$ of gas.

An ammonia injector 12 may also be fitted in the passage 6. It feeds the chamber 8 in the direction of flow, thus completing the denitrification of the effluent, the nitrogen oxides being converted to molecular nitrogen.

The two injectors operate with compressed air or stream supplied through the lines 26, to ensure good dispersion of the absorbent or ammonia in space.

If steam is used for the injectors, or if the air used for dispersion by the various injectors is not sufficient to ensure complete combustion of the unburnt combustible compounds, additional injection into the same passage 6 by an air injector 11 may be envisaged.

All the injectors are advantageously located upstream of a venturi 9, although it is not impossible for at least one of them to be arranged in the actual venturi or downstream thereof.

The inlet of the desulphurisation chamber 8 advantageously has a venturi 9. This is adapted to induce turbulence in the flow of particles and gases passing through that inlet and to assist in mixing them.

The desulphurisation chamber, of elongated shape and square or rectangular cross-section, in which the mixture of particles and gaseous effluent rises, is adjacent the combustion chamber. Their common wall 13 is uncooled or only slightly cooled.

The temperature of the resultant bed of particles or entrained bed is kept at from 750° to 1000° C. The chamber is substantially adiabatic, and the effluent is desulphurised during its stay in the desulphurisation chamber. The sulphur oxides, particularly $SO_2$, are converted to sulphate. The dwell time may, for example, be about 1 second.

The desulphurised effluent and particles of absorbent leave the desulphurisation chamber through an outlet 14 at the end of the chamber and are directed to a heat recovery chamber 16 adjacent the latter. The wall common to both chambers has an outlet port 14 at its upper end 15, the particles and gases passing through this port. The elongated heat recovery chamber 16, of square or rectangular cross-section, into which the mixture descends has heat exchange tubes 17 which may, for example, be coiled around the axis of the chamber 16. These tubes are supplied with water at 18 and have a water and steam outlet 19 connected to a capacity 30 under pressure. The tubes are arranged so that the temperature of the solid/gas mixture leaving the chamber 16 is from 120° to 400° C.

At the base of the chamber 16 there is a device 20 for extracting solids. It can possibly provide for the removal of at least part of the absorbent which would have been deposited on the tubes and eliminated by sweeping. As mentioned above, the absorbent may be recycled to the inlet 7 of the desulphurisation chamber by the appropriate means described above.

The cooled solid-gas mixture leaves the chamber 16 through the outlet 21 at the lower end thereof and is separated in a separating chamber 22, which is connected to the outlet 21 by a transfer line 23. The chamber 22 may, for example, have a bag filter 24 by which the particles of used absorbent, based on sulphates, are collected and the effluent gases freed from dust and most of the sulphur and nitrogen oxides; these are discarded into the atmosphere through a line 26 connected to the upper part of the chamber 22. The particles are passed to a storage hopper 25 through a line 27 connected to the lower part of the separating chamber 22 and possibly to the extraction device 20. At the lower end of the chamber 25 a drawing off line 55, controlled by a valve 56, extracts a portion of the used absorbent particles.

The emission rate, particularly of sulphur, is controlled by a detector 47, which may be specific to infrared light and is located in the discharge line 26 for the screened effluent. The detector is linked by a line 49 with control means 48 adapted to regulate a valve 57 via a line 58. The valve 57 delivers fresh particles which are to be injected into the desulphurisation chamber 8 by the injector 10.

When the $SO_2$ content of the effluent, determined e.g. by the detector 47, exceeds the range displayed in the control means 48, an electric signal is passed to the delivery valve 57. The valve then allows a larger quantity of particles of fresh absorbent to enter the desulphurisation chamber, thus causing a reduction in the $SO_2$ content of the effluent.

When a large amount of steam is required the quantity of fuel burned is such that the temperature of the desulphurisation chamber tends to exceed the range for optimum use of the generator. The adjustment and control means 43 linked with the temperature measuring probe 46 then pass an electric signal to the valve 40. The valve recycles more used particles, so the desulphurisation chamber is cooled and desulphurisation is effected under optimum conditions.

When the load is reduced on the other hand, the temperature drops and the means described above makes the valve operate so as to reduce the quantity of particles recycled to cool the combustion effluent. So desulphurisation is carried out within the temperature range corresponding to optimum use of the absorbent.

Thus when the combustion effluent has followed an S shaped path through the three chambers 1, 8 and 16—the central chamber 8 being adjacent the two others—it is cleaned very rapidly.

If necessary, the desulphurisation chamber may be fitted with internal means designed to increase the dwell time of the particles of absorbent and make them more effective. "Internal means" are understood, for example, as being Raschig rings or Pall rings stacked in the chamber, particles from 0.15 to 10 cm in size supported by a grid and/or fittings supported by the wall of the chamber to encourage turbulence (e.g. cross-section restrictors arranged along the chamber). The invention will be understood better from the following comparative examples with a nominal and reduced throughput, which illustrate the process.

Case No. 1: Prior Art

A heater burns 5 t/h of a fuel containing 5% of sulphur. The excess air is 15%. The absorbent used is commercial dead lime containing 95% of $Ca(OH)_2$ with a mean particle size of 8 microns. The optimum temperature range for the absorbent, defined by a laboratory test, is from 830° to 980° C. The desulphurisation chamber is formed by walls with membranes.

A desulphurisation yield of 80% is obtained when the dwell time of the gases in the desulphurisation chamber is 2 seconds and when the Ca/S molar ratio of the flow of absorbents and fumes is 2.5. The working temperature of that chamber in nominal operation is 970° C., and the temperature drop between the inlet and the outlet thereof is 40° C. The absorbent utilisation rate (molar ratio of calcium used to calcium initially introduced) is thus 32%.

When the load of the heater is reduced by 75% the temperature at the inlet on the desulphurisation chamber is only 750° C. when the absorbent has been mixed in, so desulphurisation can only be carried out with difficulty. The less good performance is due to the lower reaction kinetics and to recarbonisation (recarbonatation) of the lime. In order to reduce the desulphurisation yield to 80%, the quantity of calcium consumed has to be increased in proportions such that the Ca/S ratio is then 3.8 with a utilisation rate of 21%.

Case No. 2: According to the Invention

The heater envisaged still burns the same quantity of fuel and uses the same fuel and absorbent. The volume of the desulphurisation chamber is halved, so that the dwell time of the gases in nominal operation is only 1 second. The temperature of the particles of fresh absorbent is about 20° C., while that of the recycled particles is about 105° C. All the particles are injected in the presence of air. A fume desulphurisation yield of 80% is obtained, with a Ca/S molar ratio adjusted to 1.8 and with a recycling rate of 6. The working temperature is 970° C. in nominal operation. The absorbent utilisation rate is 44.5%. When the throughput of the heater is reduced by 75%, the particle recycling rate is lowered to 0.5. The temperature of the desulphurising chamber has then dropped to 840° C., but remains within the optimum operating range. The lowering of the recycling rate is almost totally compensated for by a lengthening of the dwell time of the absorbent in the desulphurising chamber; in order to maintain the 80% yield it is sufficient to increase the Ca/S ratio slightly to 2.0 by increasing the flow rate of fresh particles relative to that of recycled ones. The utilisation rate is then 40%.

Comparison of Cases 1 and 2 brings out the importance of the method very clearly. It economises in absorbent but also reduces the investment relative to the version without recycling; this is mainly due to the smaller volume of the desulphurisation chamber.

We claim:

1. A method of reducing emissions of sulphur oxides, and unburnt combustible compounds while generating heat,
   wherein a) combustion of a variable amount of fuel containing sulphur is effected in a combustion zone comprising a heat exchange zone, in which heat is at least partly extracted, said combustion being effected in the presence of a gas containing oxygen, under conditions substantially close to the combustion stoichiometry, and the combustion effluent is recovered at a temperature from 800° to 1200° C.,
   b) the combustion effluent and particles of fresh absorbent, containing at least one basic compound of an alkaline earth metal, are fed into at least one turbulent zone upstream of a desulphurisation zone, said particles being from 1 to 100 microns in size and having a density of 500 to 4000 kg/m³,
   c) said effluent is desulphurised in a desulphurisation zone, in the presence of said particles, in a entrained bed, at a temperature from 750° to 1000° and in an oxidizing atmosphere, under conditions such that the oxygen content at the outlet from the desulphurisation zone is from 0.1 to 5% by volume, and a mixture is produced, containing said particles comprising sulphur compounds from desulphurisation and a desulphurised gaseous effluent,
   d) said mixture is passed into a heat recovery zone, heat is at least partly extracted, and at least part of the absorbent particles is optionally recovered,
   e) the mixture resulting from stage d) is separated in a separation zone, the at least partly cooled gaseous effluent, freed from most of the sulphur oxides and unburnt combustible compounds, is discharged, and said particles of absorbent comprising at least part of said sulphur compounds are also discharged,
   characterized in that at least part of the particles of absorbent emanating from stage e) and optionally from stage d) is recycled to stage b), upstream of the turbulent zone, and the flow rate of fresh absorbent particles and that of recycled particles to stage b) are adjusted as a function of the variable amount of fuel burned in the combustion zone to maintain the temperature of the desulphurisation chamber within 750° to 1000° C.

2. The method of claim 1, wherein the concentration of fresh and recycled particles in the desulphurisation zone is from 0.02 to 1 kg/Nm3 of total effluent.

3. The method of claim 1, wherein the dwell time of the particles in the desulphurisation zone is from 0.5 to 10 seconds.

4. The method of claim 1, wherein said combustion effluent has a superfacial surface velocity of 2 to 20 m/s at the outlet of the desulphurisation zone.

5. The method of claim 1, wherein the particles of fresh absorbent are at a temperature substantially close to ambient temperature.

6. The method of claim 1, wherein the recycled absorbent particles are at a temperature from ambient temperature to 400° C.

7. The method of claim 1, wherein the particles of absorbent are recycled at a flow rate from 0.01 to 15 times that of the fresh absorbent.

8. The method of claim 1, wherein the concentration of fresh and recycled particles in the desulphurisation zone is from 0.05 to 0.2 kg/Nm3 of total effluent.

9. The method of claim 1, wherein the dwell time of the particles in the desulphurisation zone is from 1 to 2 seconds.

10. The method of claim 1, wherein the recycled absorbent particles are at a temperature of from 50° to 150° C.

11. The method of claim 8, wherein the dwell time of the particles in the desulphurisation zone is from 1 to 2 seconds.

12. The method of claim 8, wherein the recycled absorbent particles are at a temperature of from 50° to 150° C.

13. The method of claim 11, wherein the recycled absorbent particles are at a temperature of from 50° to 150° C.

14. The method according to claim 13, wherein the combustion effluent has a superficial velocity of 2–20 m/s at the outlet of the desulphurisation zone, the particles of fresh absorbent are at set temperature substantially close to ambient temperature, and the particles of absorbent are recycled at a flow rate of 2–8 times that of the fresh absorbent.

15. A method according to claim 1, wherein stage (c) is conducted continuously, and into said desulphurisation zone are passed in an alternating manner, dry absorbent particles and humid absorbent particles.

16. A process according to claim 1, wherein said absorbent is a dead lime.

17. A process according to claim 15, wherein said absorbent is a dead lime.

* * * * *